United States Patent [19]
Swartz et al.

[11] Patent Number: 6,056,258
[45] Date of Patent: May 2, 2000

[54] BOUND DOCUMENT IMAGER

[75] Inventors: Lars-Erik Swartz, Sunnyvale; Steven E. Ready, Santa Cruz; David A. Jared, Sunnyvale; Robert A. Street, Palo Alto, all of Calif.

[73] Assignee: Xerox Corporation, Stamford, Conn.

[21] Appl. No.: 09/208,595

[22] Filed: Dec. 8, 1998

[51] Int. Cl.[7] ............................. H04N 1/036; H04N 1/00; H04N 1/032
[52] U.S. Cl. .............................. 248/455; 355/25; 355/82; 347/260
[58] Field of Search ................... 248/441.1, 455, 248/457, 446; 355/25, 82; 347/260, 257

[56] References Cited

U.S. PATENT DOCUMENTS

| | | | |
|---|---|---|---|
| 3,712,729 | 1/1973 | O'Brien | 355/25 |
| 4,567,528 | 1/1986 | Wilman et al. | 355/25 |
| 4,585,334 | 4/1986 | Malyon | 355/25 |
| 4,623,247 | 11/1986 | Wilman | 355/25 |
| 4,636,868 | 1/1987 | Malyon | 355/25 |
| 4,645,332 | 2/1987 | Malyon | 355/25 |
| 4,655,478 | 4/1987 | Malyon | 281/45 |
| 4,976,408 | 12/1990 | Hertiein et al. | 248/446 |
| 5,614,991 | 3/1997 | Moro et al. | 355/75 |
| 5,777,660 | 7/1998 | Ard | 355/25 |

FOREIGN PATENT DOCUMENTS

| | | |
|---|---|---|
| 35 46 404 A1 | 7/1987 | Germany . |
| 3546404A1 | 7/1987 | Germany . |

OTHER PUBLICATIONS

Omnia OK 301 P. "The Unique Prism Camera System", by Zeutschel, four pages.
Omnia OK 301 P, "The Unique Prism Camera system", by Zeutschel, four pages.

*Primary Examiner*—Leslie A. Braun
*Assistant Examiner*—Jon A Szumny

[57] ABSTRACT

An apparatus for imaging books or other bound volumes which includes a book supporting system and an optical system positioned above the book supporting system and mounted for movement along a vertical axis toward and away from the book support system. The book support system includes an inner platform and an outer platform with the inner platform being mounted for vertical movement relative to the outer platform. A cradle having pivotable side support plates is mounted on the inner platform, and support arms are mounted on the outer platform. The support arms are positioned so that the support plates rest thereon so that as the cradle is moved downwardly, the support arms pivot the side support plates upwardly.

6 Claims, 8 Drawing Sheets

BOUND DOCUMENT IMAGER

FIELD OF THE INVENTION

The present invention relates to apparatus for capturing digital images of pages of a book in a manner which is extremely gentle to the pages and binding thereof and which is of high resolution and is distortion free. This apparatus has particular utility for archiving digital images of rare and fragile books which curators of such collections are reluctant to have manipulated.

BACKGROUND OF THE INVENTION

There exists a major effort among large libraries and museums around the world to preserve bound volumes in digital form in order to capture and preserve for posterity books which are in an increasing state of natural decay. Millions of books are so rare and priceless that only very few people are allowed to handle or even view the volumes. Many others printed widely about 100 to 200 years ago on acid paper are decaying rapidly and are becoming extremely fragile. Therefore, a major challenge is to capture the information contained therein, in digital form, before it is too late, so that it may easily be reproduced and printed, and this body of knowledge may be brought to the public at large. To this end, high quality images of billions of pages must be captured in a relatively short period of time, in a manner which will not adversely impact the physical well being of each book.

Although a number of approaches have been taken to accomplish bound volume imaging, none have been gentle enough to satisfy rare book curators and librarians that harm will not befall their collections. One approach is to capture page images while the book is lying flat upon a support, with its pages facing upwardly. Pages of books lying in this position will have a curvature in the region of the spine, which will distort the captured images. Therefore, provision must be made for either rendering them relatively flat by means of a pressure plate or, alternatively, capturing distorted images and then correcting them by means of appropriate correction software. In either case, this approach is unacceptable because the bindings of fragile books will be damaged by opening them to 180°.

Another approach is to provide a copier machine with a book supporting platen. This entails placing the book with its pages facing downwards upon the platen, which may be wedge-shaped to reduce the extent of opening the book, thus protecting its spine. When supported in this manner, both pages are imaged, either sequentially or simultaneously. Then the book is lifted and turned over so that the operator may turn its pages manually. Finally, the book is returned to the platen for further imaging. Clearly, this is an unacceptable technique for fragile books because the spine may be damaged by supporting the weight of the book and the constant manipulation will inevitably result in harm to the book.

Yet another approach is to provide a cradle to support a book in a partially open state and to introduce a wedge-shaped platen assembly between the pages for capturing page images, either simultaneously or sequentially. In order to turn pages, the cradle and wedge-shaped platen are relatively movable away from one another. In order to image the pages, these elements are driven towards one another. Suitable sensors are usually provided to insure a "soft landing" when the wedge-shaped platen contacts the book. Such totally mechanical systems have been found to be unacceptable for rare and fragile books because they rely on mechanically driven systems, which may destroy the books in the event of system malfunctions.

It is an object of the present invention to provide a mechanism which will have the lowest adverse impact on a fragile book, and yet will enable an operator to capture the highest quality images from robust as well as fragile bound volumes. To this end, the curator and librarian community, having responsibility for rare and fragile books, has insisted upon a mechanism which is wholly in the operator's manual control and which will insure that a well trained operator's tactile feedback will protect the integrity of even the rarest of books.

A further object of the present invention is to provide a manually operable mechanism which enables an operator to achieve perfect focusing and gentle contact with the book, while at the same time allowing the operator to reposition the relatively movable elements thereof in an easy and tireless manner. Such a mechanism will prevent operator fatigue, which would inevitably lead to damage of these priceless treasures.

SUMMARY OF THE INVENTION

These objects are accomplished, in one form, by the present invention which includes a book imager including a book support system and an optical system positioned above the book support system. The optical system is mounted for movement along a vertical axis toward and away from the book support system and the book support system is mounted for horizontal movement relative to the optical system. Furthermore, the book support system includes an inner platform and an outer platform, wherein the inner platform is mounted for vertical movement relative to the outer platform. A book cradle is mounted upon and moves with the inner platform to provide protection to the book binding.

DETAILED DESCRIPTION OF THE DRAWINGS

Figure 1:
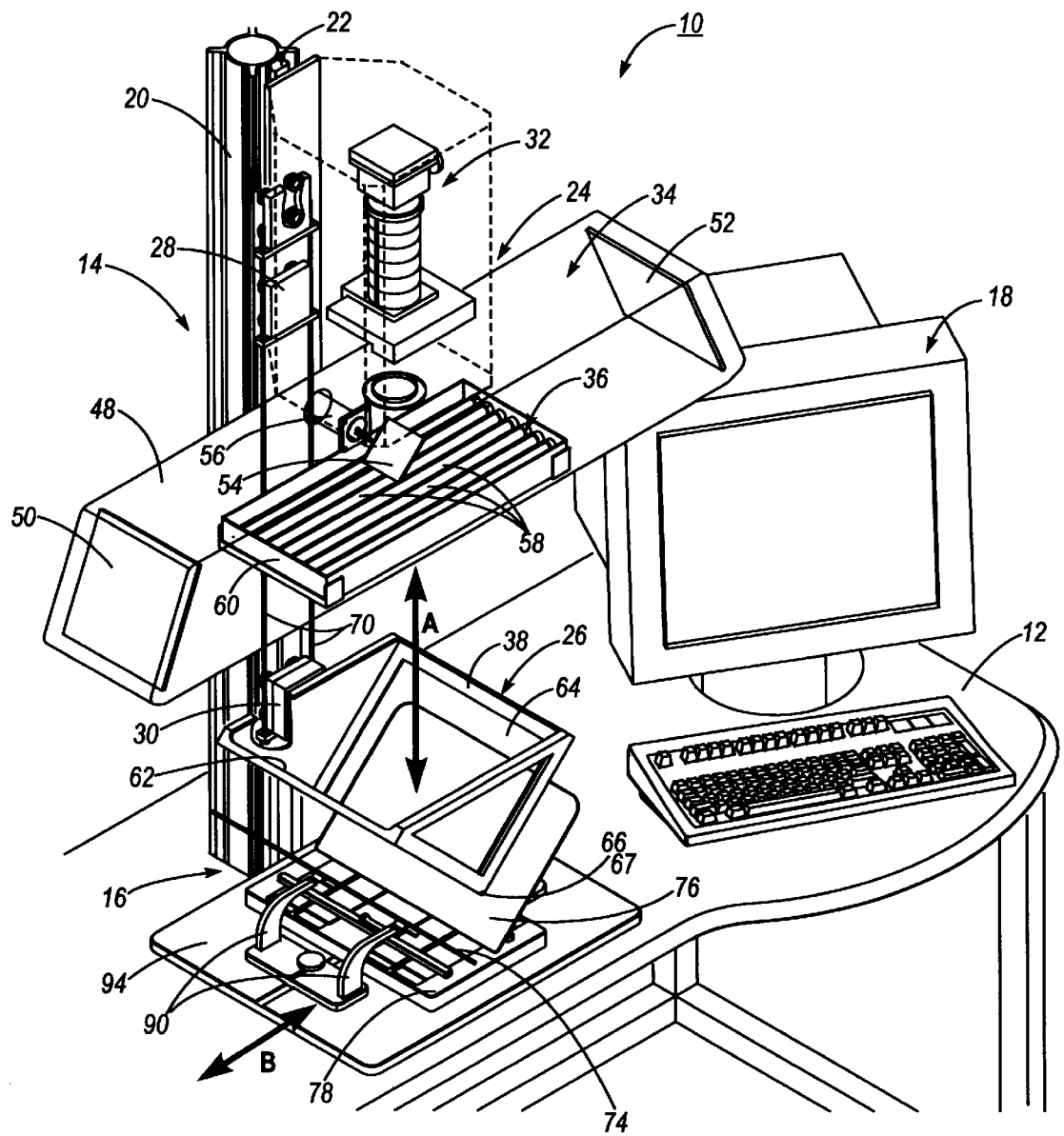
FIG. 1 is a front perspective view of a preferred embodiment of the book imager apparatus of the present invention.

Turning now to FIG. 1, there is illustrated a bound document, or book, imager, generally identified by the numeral 10, having particular applicability for capturing images of fragile books. For the purposes of the present description, the term "book" is intended to include not only books having either a hard cover or a soft cover, but also periodicals, manuscripts, and any other compilation of bound or joined pages. Additionally, the term "image" or "imaging" is intended to include any manner of image capture known in the art, which enables subsequent image reproduction. In its preferred form, the present invention relates to digital image capture, but it also comprehends analog image capture. The book imager 10 comprises a supporting table 12 upon which is mounted a vertically movable optical assembly 14 (whose direction of movement is indicated by arrow A and will be described in detail below) overlying a horizontally movable book support system 16 (whose direction of movement is indicated by arrow B and will be described in detail below). Operatively electronically connected to the book imager is a memory device and processor and, if desired, a display and editing device 18.

Figure 2:
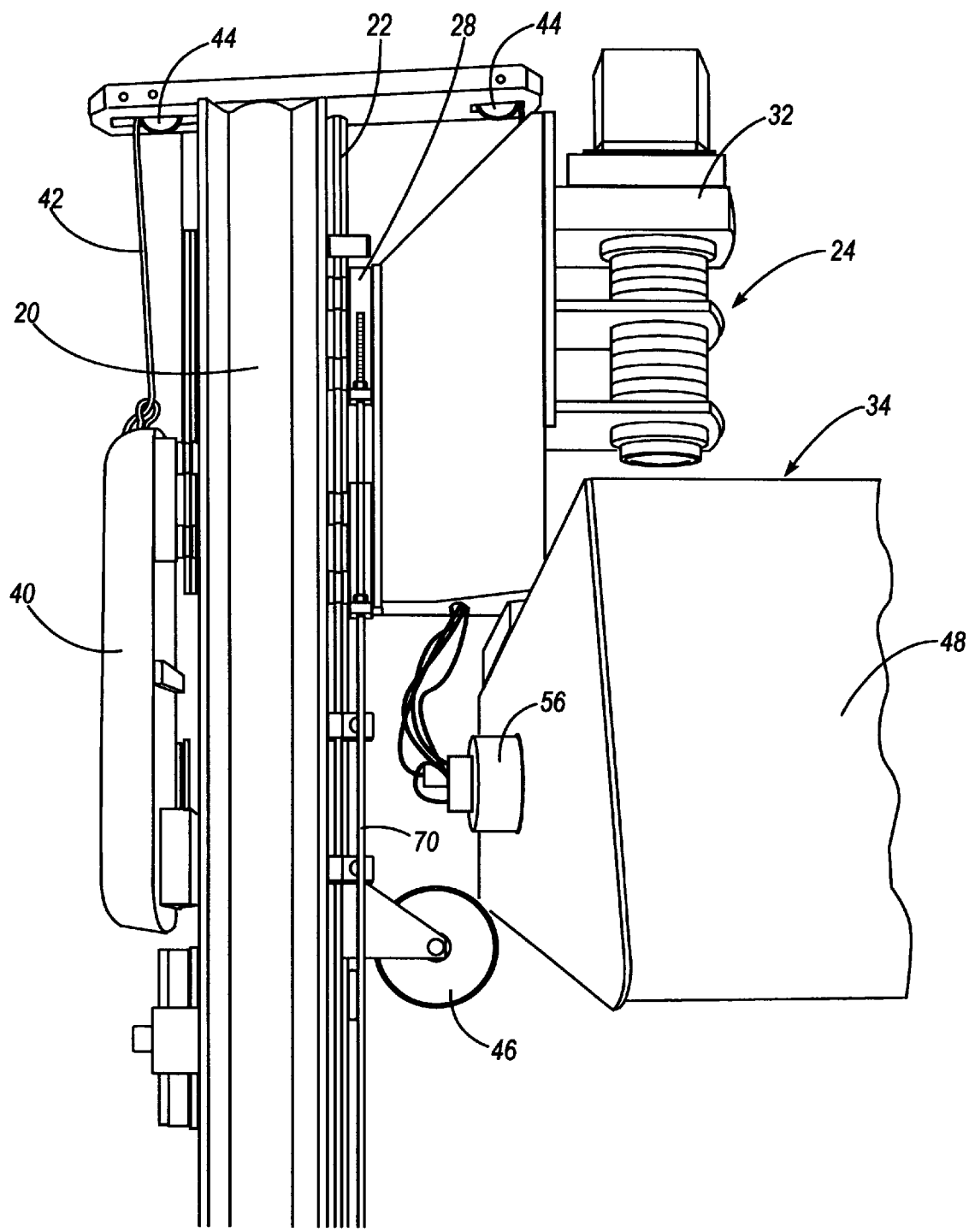
FIG. 2 is a side perspective view, showing the upper portion of the book imager apparatus.
Figure 3:
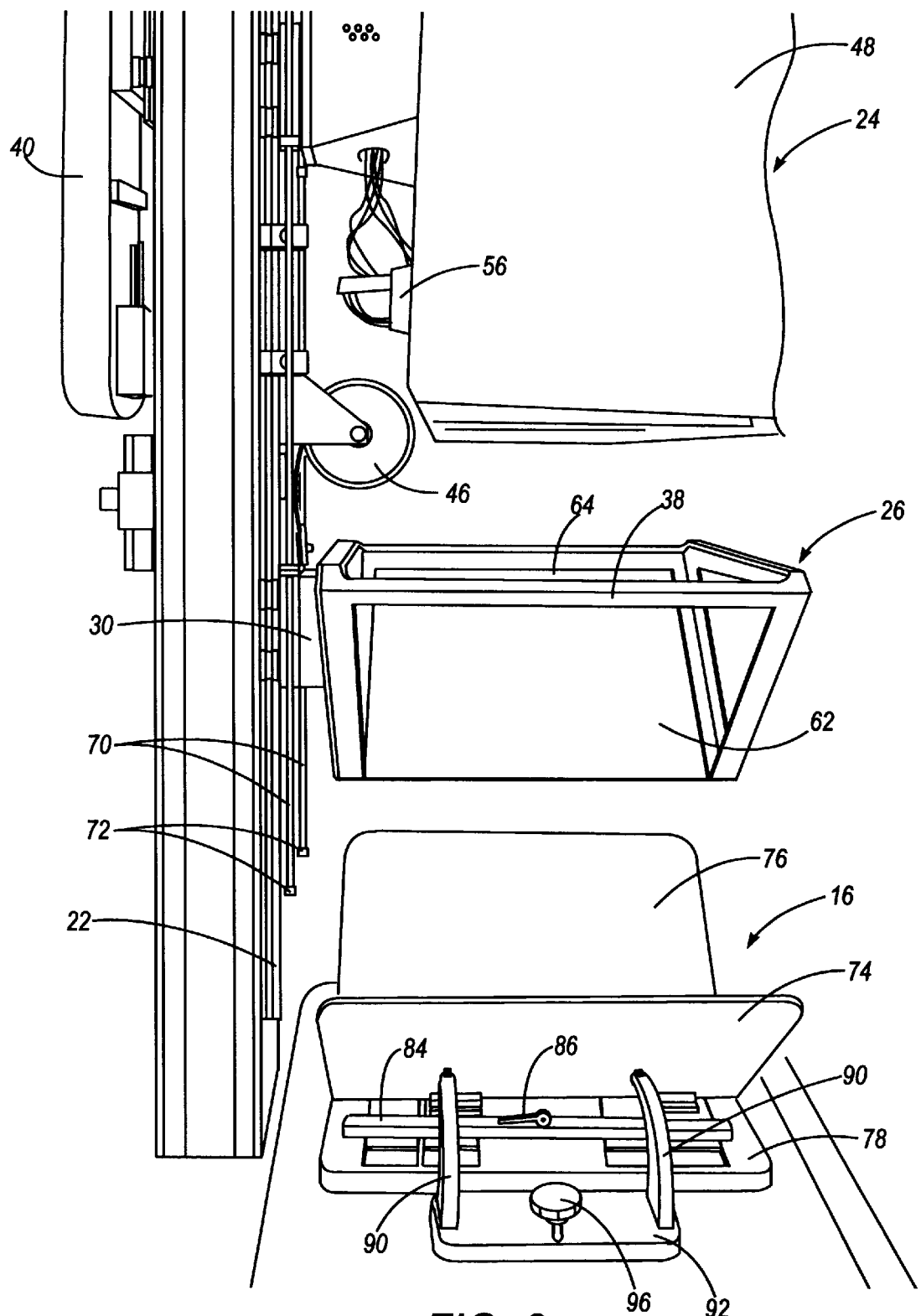
FIG. 3 is a side perspective view, showing the lower portion of the book imager apparatus.

An upright standard 20, secured to the supporting table 12, is provided with an axial track 22 to which is coupled an upper portion 24 of the optical assembly and a lower portion 26 of the optical assembly. Each portion is connected to the track 22 and moves vertically thereon by means of upper and lower, roller supported carriages 28 and 30. The upper portion 24 comprises a camera unit 32, a mirror unit 34, and an illumination source 36. The lower portion 26 comprises a wedge platen assembly 38. Each portion 24 and 26 includes a counterbalance system for allowing an operator to easily reposition its vertical location with a minimum of effort, and retain its position without the necessity of a locking mechanism. For the upper portion, a counterweight 40 (shown in FIG. 2) is connected to the upper carriage 28 by means of a cable 42 and pulley 44 system. For the lower portion, a constant force spring 46 (shown in FIG. 3) is attached at one end to the upright standard 20 and at its other end to the wedge platen 38. If desired, a pair of magnets (not shown) may be mounted on the lower carriage 30 and on the upright standard 20 at an upper, docking, position so that when the wedge platen is raised to the docking position, where the magnets are in alignment, they will latch and provide a fail-safe mechanism to insure that the wedge platen does not inadvertently slide downwardly onto a fragile book.

In its preferred form the camera 32 is a digital camera including a standard camera body and a two dimensional CCD image capture device. High resolution images have been obtained with a 4000×4000 pixel CCD. Alternatively, other image capture devices can be used, including a one dimensional scanning CCD, a two dimensional thin film transistor imaging array, photographic film or other photosensitive element. As shown, a bellows unit connects the camera body to a shutter and lens mechanism. It has been found that best results are obtained with the addition of IR and color filters (not shown).

The mirror unit 34, positioned directly below the camera unit 32, comprises a roof structure 48, housing left and right roof mirrors 50 and 52 and a central two-position rotatable mirror 54 aligned with the optical axis of the camera. The mirror 54 is driven between ±45° and −45° (relative to the vertical direction) by motor 56. The preferred illumination source 36 comprises a set of parallel fluorescent tubes 58 aligned in the long direction of the roof structure 48 and optically isolated therefrom by a reflective housing 60 (whose top surface has been removed in FIG. 1 to enable the viewing of the tubes) which allows light to be directed only downwardly, toward the wedge platen 38.

Figure 4:
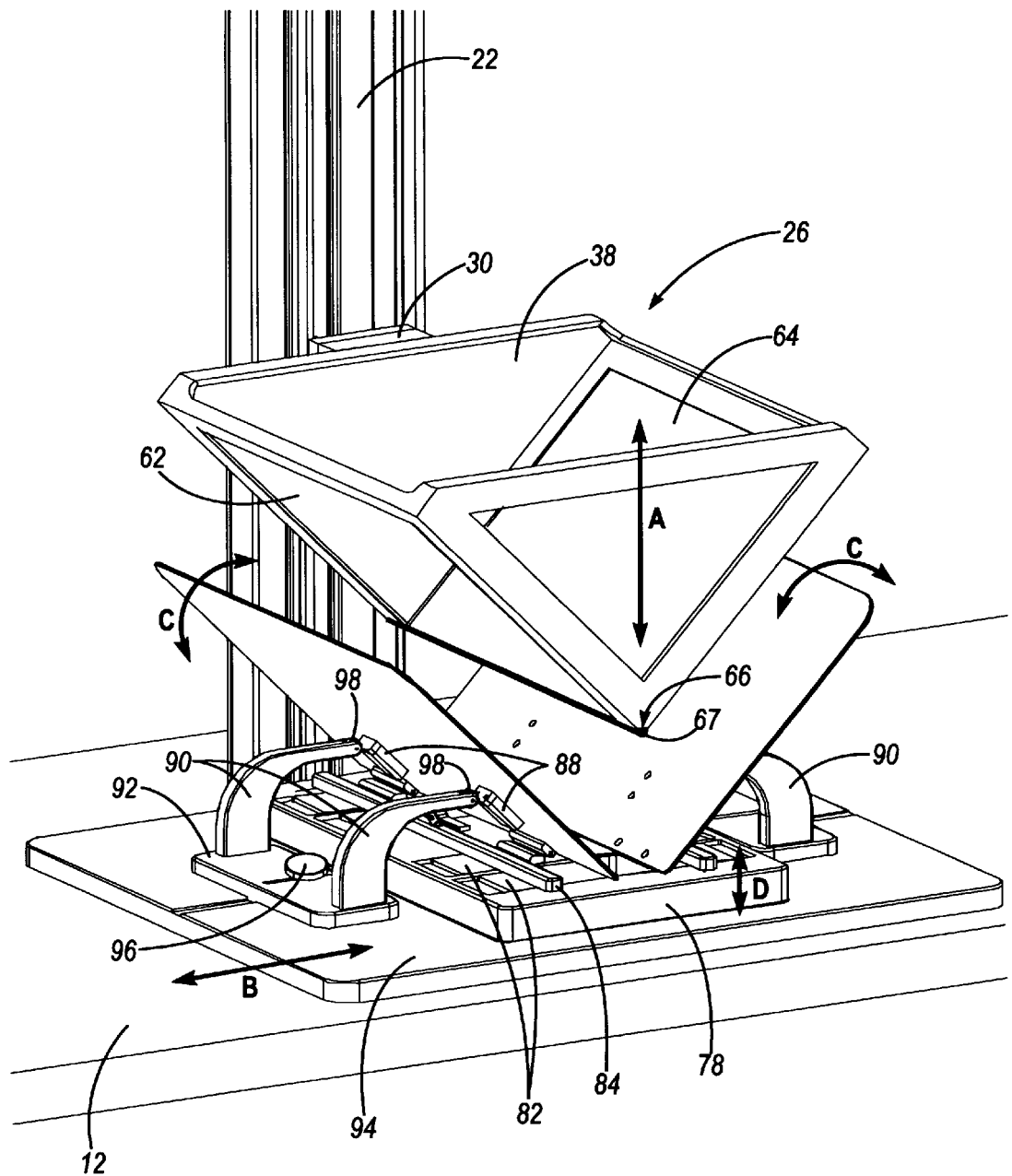
FIG. 4 is a front perspective view, showing the lower portion of the book imager apparatus.
Figure 5:
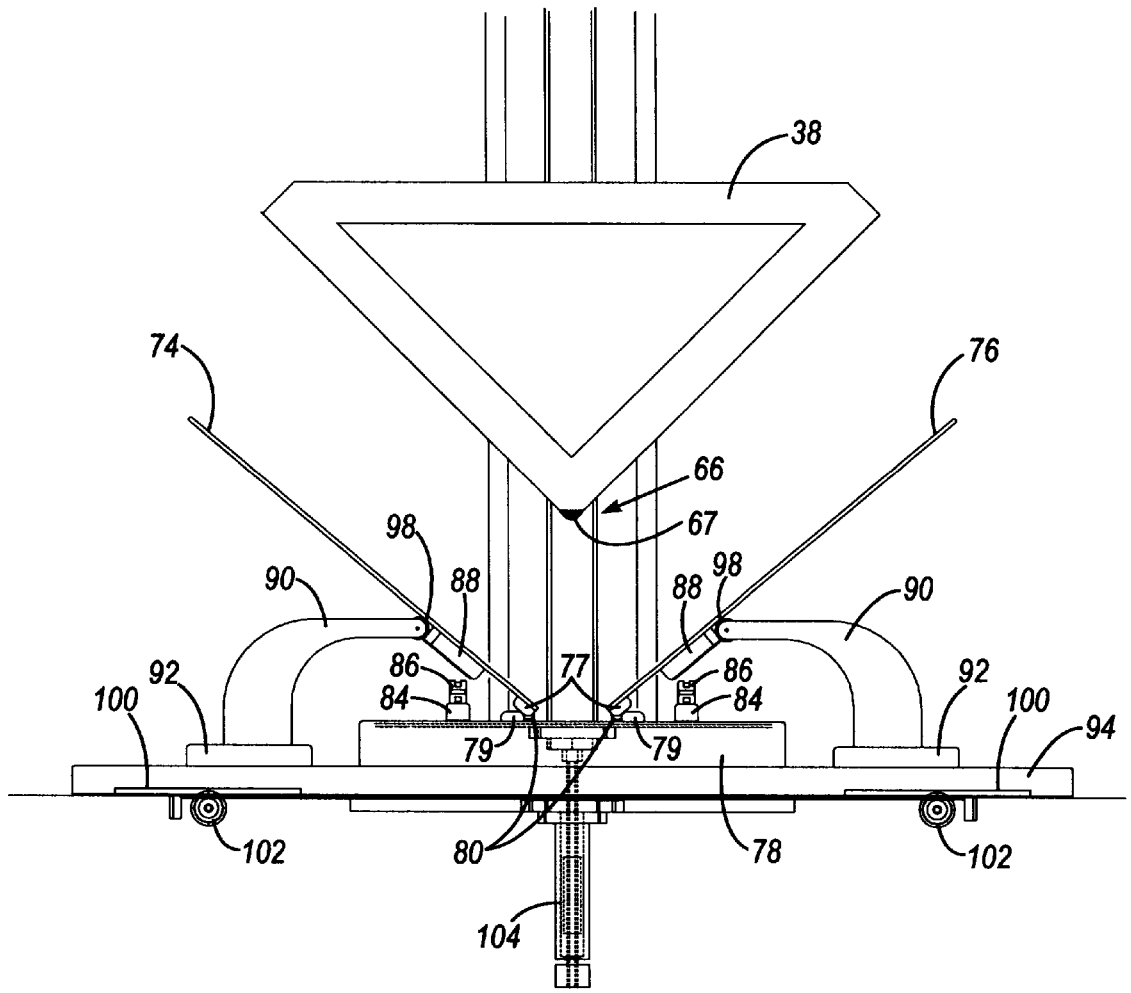
FIG. 5 is a front elevation view, showing the lower portion of the book imager apparatus.

The wedge platen 38 (best shown in FIG. 4) which comprises the lower portion of the optical assembly, includes a frame which supports two sheets of optical grade platen glass 62 and 64 positioned at a 90° angle relative to one another. Platen glass 62 is substantially parallel to the −45° position of rotatable mirror 54 and platen glass 64 is substantially parallel to the ±45° of rotatable mirror 54, so that the light traces reflected off the pages of a book are projected into the camera via the roof mirrors and the rotatable mirror. At the apex 66 of the wedge platen, the glass sheets are brought together in order to allow the pages to be imaged very close to the fold of a book. In order to prevent sharp corners of the glass platens from damaging the pages, a smooth bead 67 of resilient material having a low coefficient of sliding friction, such as TEFLON®, is placed at the apex.

Although the upper and lower portions of the optical system 24 and 26 are movable independently, they are interconnected by means of connecting rods 70 secured to and depending from the upper roller supported carriage 28 and passing through bearing sleeves in the lower roller supported carriage 30. Adjustable rod stops 72, mounted at the ends of the connecting rods, serve to limit the extent of separation between the upper and lower portions of the optical system. At the point where the lower carriage is in contact with the rod stops, and the maximum separation is established, the optical path of the camera is set to a predetermined length between the image plane, at the page/platen interface, and the focal plane of the camera. Thus, the imaged pages of a cradled book always will be in focus when the lower carriage bottoms out. Once the maximum separation occurs, further downward movement of the wedge platen 38 will drive the entire optical system as a unit with a fixed length optical path.

The horizontally movable book support system 16 includes cradle having a pair of book side support plates 74 and 76, each plate having two hinge mounting pads 77, and an inner platform 78 having two pairs of complementary hinge mounting pads 79. Web hinges 80 are secured between mounting pads 77 and 79 to allow the support plates to move with an additional degree of freedom to compensate for skew-like variations in book dimensions, which are common in old volumes. As shown, the hinge mounting pads 77 ride on hinge mounting pads 79 thereby defining the pivot axis for the support plates (whose direction of pivotal movement is indicated by arrows C, in FIG. 4). The hinge mounting pads 79 are secured to sliders 82 mounted for lateral movement on inner platform 78. Thus, there are four sliders, two supporting each side support plate. A locking bar 84, controlled by locking toggle 86, on each side of the cradle allows the operator to release, reposition and lock the sliders 82 for independently moving each side support plate laterally. In this manner, books of different thickness can be accommodated. Optimally, when in their rest position, the side support plates should be angled at about 100° in order to allow the supported book to be cradled in a relaxed manner without stressing the binding. In order to reliably achieve that supporting angle, there is provided, on each support plate 74 and 76, a pair of stop pads 88 which cooperate with a pair of laterally adjustable buttressing support arms 90. The base end of each support arm 90 is mounted upon an adjustable base plate 92 which in turn is seated upon outer platform 94. Each adjustable base plate 92 may be locked into position on the outer platform by means of locking knob 96. In this manner, a pair of buttressing support arms having rollers 98 at their ends provide support for a pivotable side support plate. When the side support plate moves relative to the support arms (as will be described), the rollers insure smooth movement. Of course, any low friction terminus may be used. The desired 100° resting angle between the side support plates is achieved when the buttressing support arms are laterally moved to a location wherein rollers 98 are in contact with the stop pads 88.

In order to support the dual platform 78/94 for movement laterally (in the direction of arrow B) in an extremely smooth manner, a set of rails 100 is provided on the underside of the outer platform 94 and a set of rollers 102 is mounted on the support table 12. The inner platform 78 is mounted for limited vertical movement (indicated by arrow D), relative to outer platform 94, on a pair of spring-loaded connecting posts 104 including linear bearings to insure smooth, jam-free operation.

Figure 6:
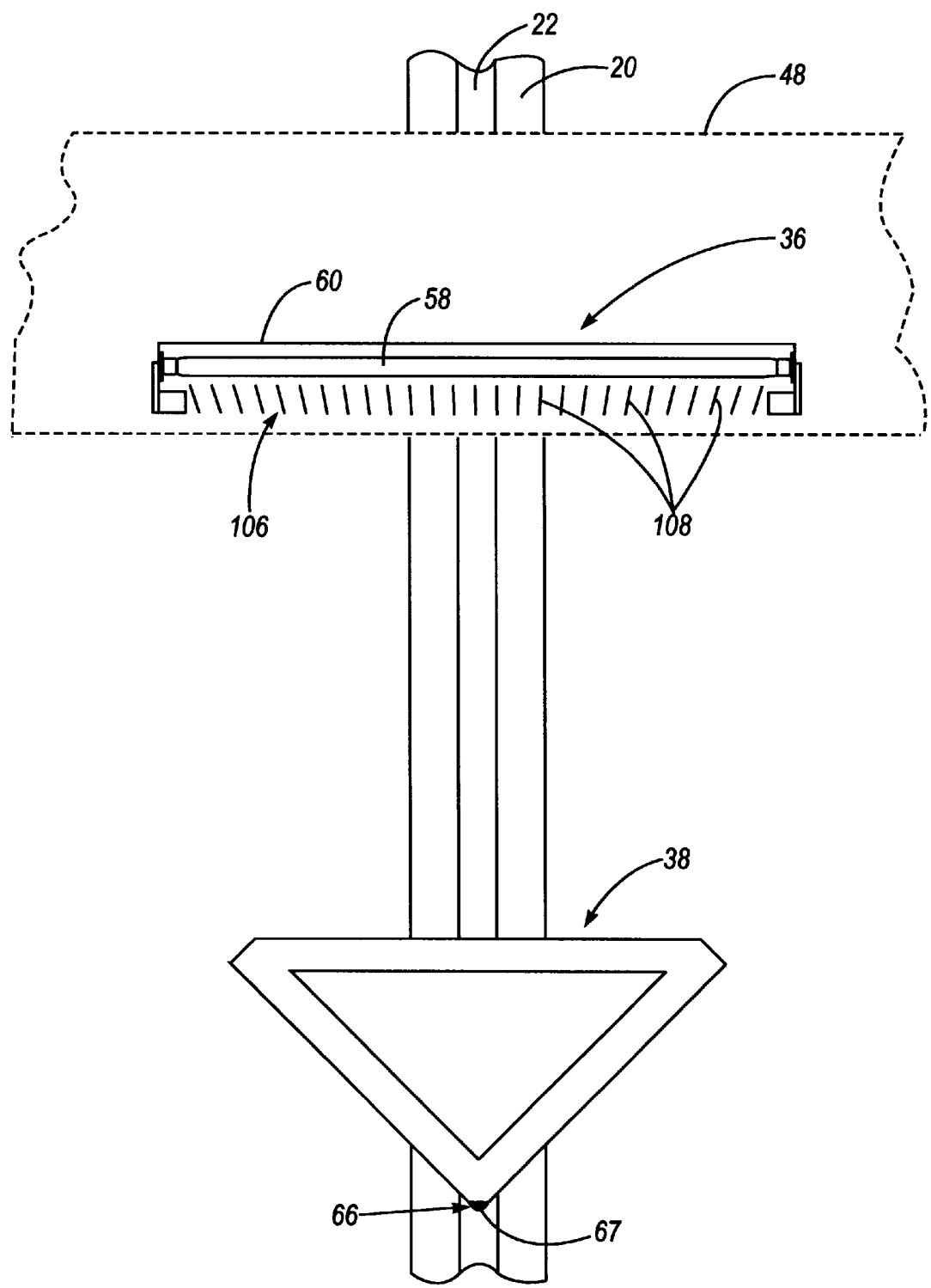
FIG. 6 is a partial front elevation view, showing the illumination system of the book imager apparatus.

As described above, the illumination source 36 directs light downwardly onto the wedge platen 38. The illumination intensity profile over the platen glass sheets 62 and 64 will tend to be non-uniform because illumination intensity drops off in proportion to the square of the distance from the source and downwardly directed light rays will have a longer path to travel to reach the page portion at the center of the book than to reach the page portion at the edges. In order to obtain uniform illumination over the pages of a book seated in the cradle, an illumination compensation shield 106 is placed adjacent to the illumination source (shown in FIG. 6). The shield is comprised of a plurality of blinds 108, each blind extending parallel to the apex 66 of the wedge platen and each blind element being disposed at an angle to pass an amount of light proportional to its the distance above the wedge platen. Thus, the blinds in the center of the shield are disposed vertically, while the slant angle is increased to cut off progressively more downwardly directed light from portions of the illumination source further from its center.

BOUND DOCUMENT IMAGER OPERATION

The following steps are performed when it is desired to image a book. First, the operator turns on the power, at which time the illumination source 36 is energized and the rotatable mirror 54 is cycled by motor 56 to initialize it. Next, the operator manually raises the wedge platen 38 to its uppermost position, against the constant force spring 46, to a position where it will not interfere with the set-up steps and where it may be latched by failsafe magnets (if such have been provided).

At this point, a number of set-up adjustments are made by the operator to accommodate the selected book to be imaged. The toggles 86 are manipulated to unlock the locking bars 84, thus allowing sliders 82 to be released and the side support plates 74 and 76 to be repositioned. The selected book to be imaged is carefully placed, in its closed condition, with its binding resting on the inner platform 83, between the side support plates. The plates are pivoted upwardly and moved laterally on the sliders until the plates are in intimate contact with the covers of the book. Then the toggles 86 are manipulated to their locked positions to clamp the locking bars 84 against the sliders 82, thereby establishing the correct distance between the side support plates. At this point, the book is set aside and the plates are lowered to rest upon the rollers 98 at the ends of buttressing support arms 90. In order to establish the approximately 100° relaxed cradling angle between the support plates, the locking knobs 96 are loosened and the base plates 92 are moved laterally until the rollers 98 supporting the side support plates 74 and 76 are in contact with the stop pads 88. Finally, the locking knobs are tightened and the set-up is complete.

After set-up has been accomplished, the operator once again places the book on the cradle, resting it at the relaxed 100° angle, and opens it to the first page to be imaged. From its raised position above the cradle, the operator manually lowers the counterbalanced wedge platen 38 gently toward the book. When the wedge platen is approximately one inch above the book, it will couple with the upper optical assembly 24 as the lower roller supported carriage 22 contacts rod stops 72 on the ends of connecting rods 70. Further downward movement of the wedge platen will lower the entire optical assembly 14 as a single unit with a fixed length optical path. The coupled optical assembly is then lowered more slowly until the apex 66 of the wedge is about to contact the book surface. At this point, depending on whether the book to be imaged is fragile or robust, the operator can choose how these mechanical elements are to be manipulated to interact with the book.

Figure 7:
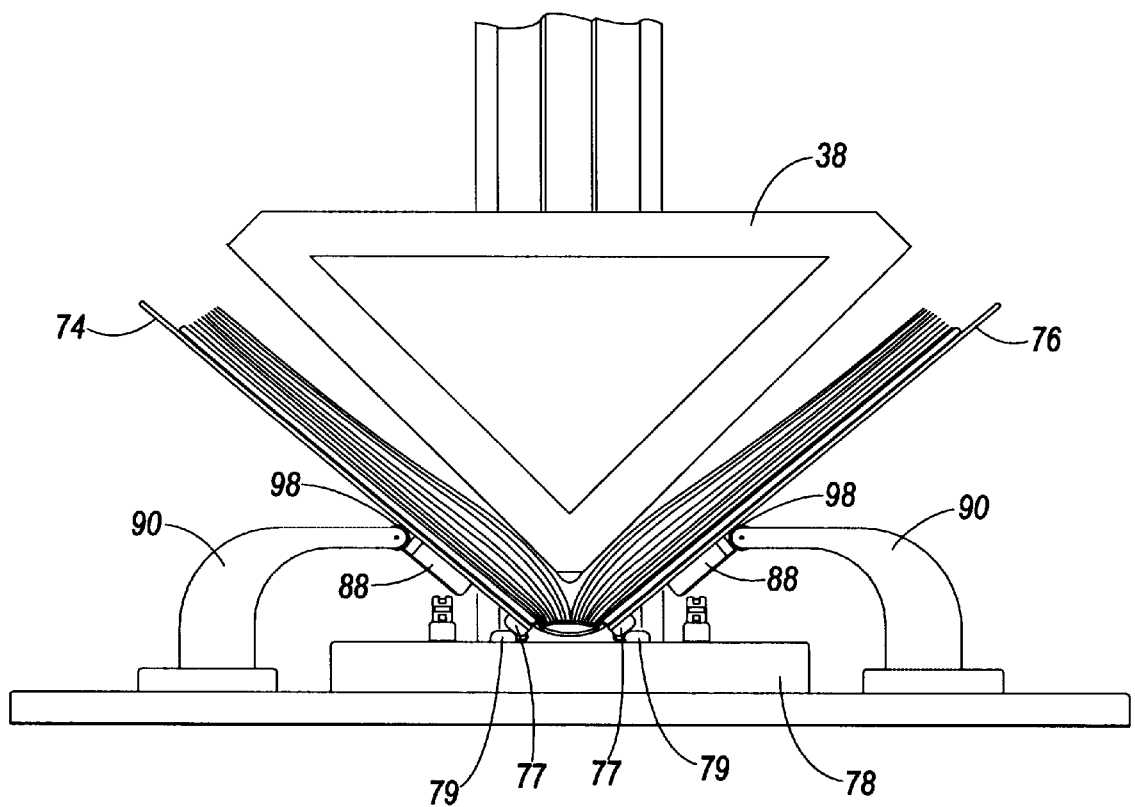
FIG. 7 is a partial front elevation view, showing the wedge platen as it initially contacts the book.

For fragile books, whose pages cannot withstand normal treatment, all interactions with the apparatus must be carefully and gently guided manually by the operator. Once the wedge platen has been moved into the vicinity of the book, its further movement towards the book is significantly slowed, while the book cradle is slowly moved laterally until the apex of the wedge 66 is substantially aligned with the fold of the book. Then the operator will manually lower the wedge platen until the platen glass panels 62 and 64 contact the pages of the book (as shown in FIG. 7) while manually raising the side support plates 74 and 76 from the buttressing support arms 90. It is well understood that when the book is opened, its pages assume a curvature, and that while capturing an image the page should lie flat against the platen glass. Therefore, the operator must carefully move the wedge platen further downwardly while simultaneously raising the support plates, in order to cause the pages to lie flat against the platens 62 and 64. At no time does the apex of the wedge contact and apply stress to the spine.

While maintaining the wedge platen and the side support plates in this position, and with the illumination source energized, the operator preferably would depress a foot pedal (not shown) to trigger the computer to activate the camera shutter. The image of a first page is projected via an optical path including one roof mirror and the rotatable mirror 58 to the focal plane of the camera 32. Then, if desired, an image of the opposing page is projected to the focal plane of the camera, after the motor 56 shifts the position of the rotatable mirror by 90°. After imaging, the side plates are carefully lowered to again rest upon the buttressing support arms and the wedge platen is raised sufficiently high to allow the operator to either turn the pages and repeat the steps, or to remove the book.

Figure 8:
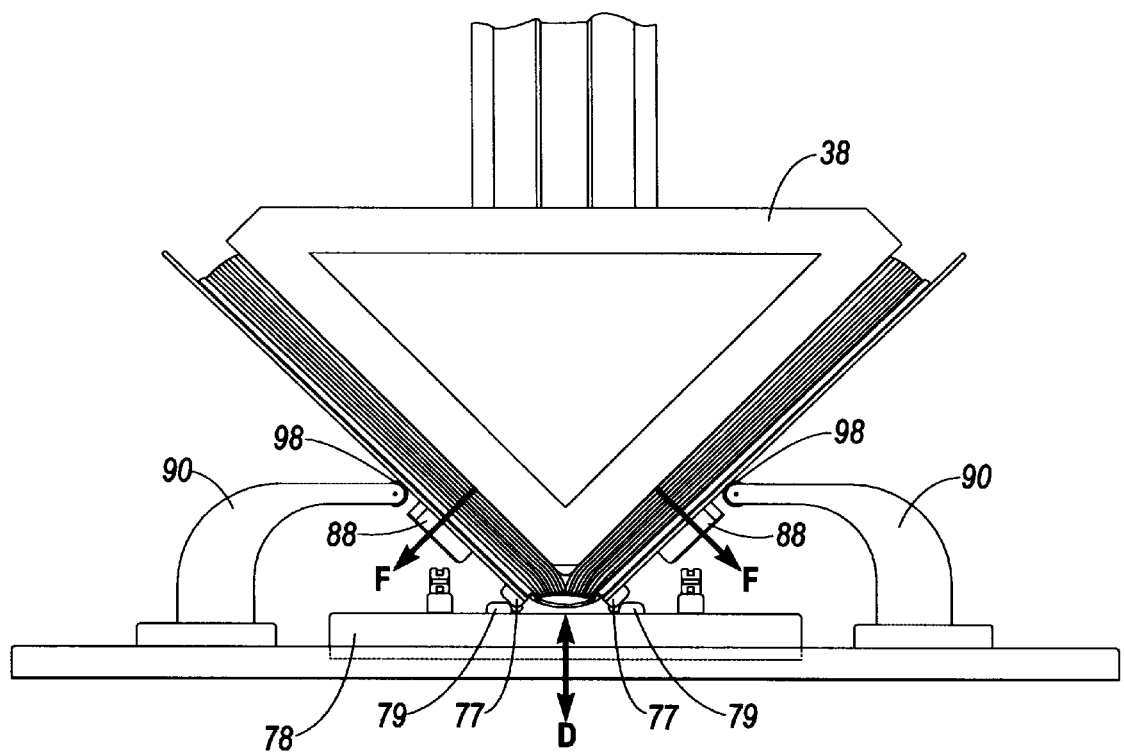
FIG. 8 is a partial front elevation view, showing the further application of force by the wedge platen to the book surface.

While the apparatus is also manually operated for robust books, its elements may be driven via the wedge against the book, thereby enabling quick and easy operation and resulting in a high page per minute throughput. Once the operator has placed a book in the cradle, its fold may be offset from direct alignment with the wedge apex 66. If this is the case, as the wedge platen is urged downwardly against the book, the low friction bead 67 will contact a portion of the page, exerting a downward force component and a lateral force component thereon. Initially, the lateral component will drive the book and its cradle incrementally in a lateral direction until the wedge apex self aligns with the fold of the book and the platen glass panels 62 and 64 contact the curved pages of the book (as shown in FIG. 7). As the operator exerts further downward pressure on the wedge platen (as shown in FIG. 8) to flatten the curvature of the pages for proper imaging, the forces acting on the book are equally applied to the opposing pages, in a direction normal to the platen glass (as indicated by arrow F in FIG. 8). The binding will not be strained nor distorted thereby. Continued operator pressure drives the inner platform 78 downwardly due to the vertical force component of normal forces F. The vertical force acts against the upward bias of the springs in the connecting posts 104. As the inner platform is moved downwardly, the rollers 98 drive the support plates 74 and 76 upwardly and inwardly, pivoting on hinge mounting pads 77 and 79, until the opposing pages are in intimate contact with the glass platens 62 and 64. It should be noted that the integrity of the book is protected because the entire applied force is directed substantially normal to the pages, and is transferred through the book pages to the side support plates 74 and 76, pivot pads 77/79 and buttressing support arms 90. The binding of the book is neither displaced nor distorted.

The operator may then capture page images by actuation of the camera shutter, either by means of a foot pedal or an image control button (neither shown). Preferably, the images are displayed on the workstation screen and are also captured in memory for subsequent image processing.

It will be appreciated that the present invention is not limited to the design or the specific orientation of the preferred embodiment, and that structures equivalent to those described hereinabove are encompassed within the scope of the present invention.

What is claimed:

1. A book imager comprising a book support system and an optical system positioned above said book support system and mounted for movement along a vertical axis toward and away from said book support system and wherein said book support system includes:

an inner platform and an outer platform, said inner platform being mounted for vertical movement relative to said outer platform, a cradle having pivotable side support plates mounted on said inner platform, and support arms mounted on said outer platform and positioned so that said support plates rest thereupon, whereby as said cradle is moved downwardly, said support arms drive said side support plates upwardly.

2. The book imager as defined in claim 1 wherein said side support plates have an upper surface upon which a book may be supported and a lower surface having stop pads mounted thereon, and wherein said support arms are adjustably mounted on said outer platform for horizontal movement relative thereto, whereby when said side support plates rest upon said support arms with said stop pads in contact with said support arms, said support plates are disposed at a predetermined rest position for supporting a book.

3. The book imager as defined in claim 2 wherein said predetermined rest position subtends an angle of substantially 100° between said plates.

4. The book imager as defined in claim 1 wherein said support arms include an upper terminus upon which said side support plates rest, said upper terminus comprising a low friction element.

5. The book imager as defined in claim 4 wherein said terminus comprises a roller.

6. The book imager as defined in claim 1 wherein said inner platform is spring mounted for vertical movement.

* * * * *